Patented Mar. 19, 1946

2,397,013

UNITED STATES PATENT OFFICE 2,397,013

CYANINE DYESTUFFS AND DYESTUFF INTERMEDIATES

John David Kendall, Ilford, England, assignor to Ilford Limited, Ilford, England, a company of Great Britain No Drawing. Application February 16, 1942, Serial No. 431,165. In Great Britain April 7, 1941

9 Claims. (Cl. 260—240)

This invention relates to the manufacture of dyestuffs and dyestuff intermediates and particularly to the manufacture of dyestuffs suitable for sensitising silver halide photographic emulsions.

In co-pending application No. 431,164 filed on even date herewith, corresponding to British application No. 4,601/41 there is described the production of compounds of the general formula:

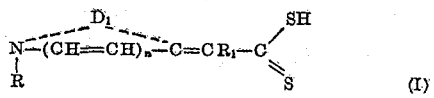

where R is an alkyl group or an aralkyl group, $R_1$ is a hydrogen atom or an alkyl, aryl or aralkyl group, $D_1$ is the residue of a heterocyclic nitrogen compound, and $n$ is nought or 1.

Furthermore, in co-pending application No. 431,167 filed on even date herewith, corresponding to British application No. 4,604/41 there is described the production of compounds of the general formula:

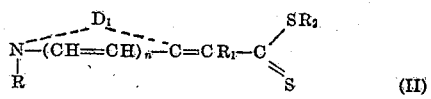

where R, $R_1$, $D_1$ and $n$ have the meanings assigned to them above and $R_2$ is an alkyl or aralkyl group.

According to the present invention valuable dyestuff intermediates are obtained by treating compounds of the general Formula I or II with an alkyl or aralkyl salt. The course of the reaction in the first case is believed to be as follows, the alkyl or aralkyl salt being represented as $XR_2$, X being the acid radicle and $R_2$ the alkyl or aralkyl radicle:

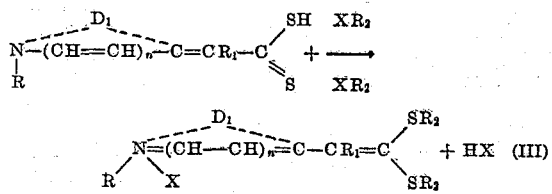

In some cases it is desirable to carry out the reaction in the presence of an alcohol $R_2OH$ in order to convert the HX formed into $R_2X$.

In the second case the course of the reaction is an addition of the groups X and $R_2$ as follows:

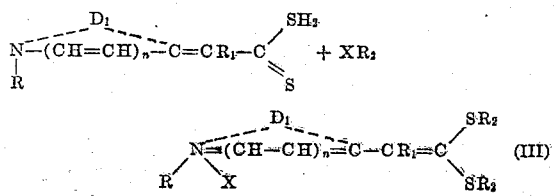

It will be observed that if the alkyl or aralkyl group of the quaternising salt is different from the group $R_2$ then the two groups $R_2$ in the final product will be different. It is to be understood that the present invention includes the intermediates of the formula stated whether the groups $R_2$ are the same or different.

According to a further feature of this invention dyestuffs are obtained by condensing, in the presence of a base and a solvent, a compound of the general Formula III with one of the following types of compounds:

(a) A five-membered ring compound containing the system:

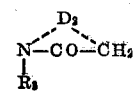

where $R_3$ is a hydrogen atom or a hydrocarbon group and $D_2$ is the residue of a heterocyclic nitrogen keto-methylene nucleus.

(b) A quaternary salt of a heterocyclic nitrogen compound having a reactive methyl group, mono-substituted methyl group or external methylene group or N-reactive amino or imino group in the α or γ position to a heterocyclic nitrogen atom, e. g. a compound of the general formula:

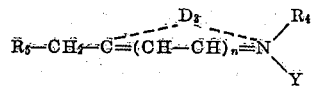

or

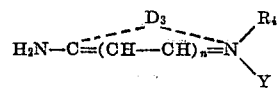

where $D_3$ is the residue of a heterocyclic nitrogen compound of the type used in cyanine dyes, $n$ is nought or 1, $R_4$ is an alkyl or aralkyl group and $R_5$ is a hydrogen atom or hydrocarbon group.

(c) Quaternary salts of compounds of the general formula:

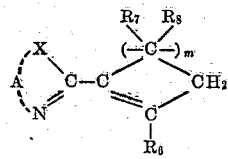

where A is the residue of a thiazole, oxazole or selenazole nucleus (including the benz and benzbenz compounds of this type) or of a thiazoline, oxazoline or selenazoline nucleus, $R_6$, $R_7$ and $R_8$ are hydrogen atoms or hydrocarbon groups, $m$ is an integer greater than 1 (X being an oxygen, sulphur or selenium atom).

(d) Compounds of the general formula:

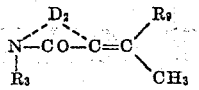

where $D_2$ and $R_3$ have the meanings assigned to them above, and $R_9$ is a hydrogen atom or a hydrocarbon group.

The foregoing compounds $a$ to $d$ are characterised by the fact that they all contain a reactive $CH_2$ group or a reactive NH group (a reactive methyl group, which may be written as $-CH_2-H$, includes a reactive methylene group).

Where in the foregoing formula reference is made to the fact that a group may be a hydrocarbon group, it is intended to imply that the group in question may be an alkyl, aryl, aralkyl group or an unsaturated hydrocarbon group; examples are methyl, ethyl, propyl and butyl groups and higher fatty alkyl groups, benzyl and naphthyl-methyl groups, phenyl and naphthyl groups, allyl and cinnamyl and like groups. Where the hydrocarbon group contains an aryl residue, such residue may itself be substituted, e. g. with alkyl or aralkyl groups, oxyalkyl groups, alkyloxy groups, amino groups, hydroxy groups and halogen atoms.

According to a further feature of the invention, when the five-membered ring compound of type $a$ above, which is condensed with the quaternary salt of the compound of Formula III corresponds to the general formula:

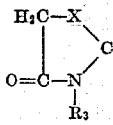

($R_3$ being a hydrogen atom or a hydrocarbon group, and X being an oxygen atom or a sulphur atom) the resulting product contains a thione grouping and so may be treated with an alkyl or aralkyl salt and condensed with any of the compounds $a$ to $d$ enumerated above, i. e. the process of the invention may be repeated to add a further group to the product.

When this second condensation is with a five-membered ring compound of type $a$ above which also corresponds to the general formula:

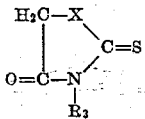

($R_3$ being a hydrogen atom or a hydrocarbon group and X being an oxygen atom or a sulphur atom) the product will once more contain a thione grouping, and by proceeding in this way the condensation may be repeated as often as desired; the final product obtained by any such series of condensations may be further condensed according to the invention with any of the other types of compound $b$ to $d$ above to give a dyestuff comprising two nuclear groups, for example, heterocyclic nitrogen nuclei, linked by a chain of any desired number of keto-thiazoline or keto-oxazoline rings.

Examples of the compounds of type $a$ which may be condensed with the compounds of Formula III according to our invention are rhodanic acid and N-hydrocarbon substituted rhodanic acids, 2-thio-4-keto tetrahydro-oxazole and N-hydrocarbon substituted compounds of this type, and the compounds enumerated in the specification of British Patent No. 426,718 filed October 3, 1933, namely oxindoles, pyrazole-5-ones, hydantoin, thio-hydantoin, ψ-hydantoin, ψ-thio-hydantoin.

Compounds of type $b$ which may be employed may be any of those which have been used or proposed for use in the many processes for the production of cyanine and similar dyestuffs, for example, thiazoles, oxazoles, selenazoles and their polycyclic homologues such as those of the benzene, naphthalene, acenaphthene and anthracene series; pyridine and its polycyclic homologues such as quinoline and α and β naphthaquinolines, lepidines; indolenines; diazines, such as pyrimidines and quinazolines; diazoles (e. g. thio-ββ'-diazole), oxazolines, thiazolines and selenazolines. The polycyclic compounds of these series may also be substituted in the carbocyclic rings with one or more groups such as alkyl, aryl, amino, hydroxy, alkoxy and methylenedioxy groups, or by halogen atoms. Specific compounds of type $c$ are decribed in co-pending application No. 426,097 corresponding to British application No. 690/41 and specific compounds of type $d$ are described in U. S. Patent No. 2,213,986.

Where heterocyclic nitrogen nuclei are referred to in this specification they may be any of those which have been used or proposed for use in the many processes for the production of cyanine and similar dyestuffs, for example, those listed in the preceding paragraph.

The compounds of general Formula III may be obtained, as indicated above, by the treatment of a compound of general Formula I with an alkyl or aralkyl salt. Alternatively they may be obtained by the treatment of a compound of the general Formula II with an alkyl or aralkyl salt.

The formation of the dyestuffs is readily effected by heating the reagents together, preferably in the presence of a solvent, and a base, e. g. pyridine, piperidine, diethylamine, triethylamine and triethanolamine, or an inorganic base such as a solution of sodium or sodium acetate in ethyl alcohol. In those processes where the compound of general Formula III is condensed with an alkyl or aralkyl quaternary salt of a heterocyclic nitrogen base, the conversion of the heterocyclic nitrogen base to the quaternary salt by treatment with an alkyl or aralkyl salt may be effected simultaneously with the formation of the dyestuff by heating a compound of Formula III, the heterocyclic nitrogen base and the alkyl or aralkyl salt. Thus, for example, the dyestuffs may be obtained by fusing together a compound of the type described in co-pending application No. 431,167 filed on even date herewith, (corresponding to British application 4,604/41) a heterocyclic nitrogen compound containing an external reactive methyl group in the α or γ position to the heterocyclic nitrogen atom, and an alkyl sulphate or an alkyl-p-toluene sulphonate.

Where the dyestuff is obtained in the form of a sulphate or an alkyl-p-toluene sulphonate, it may be converted to a salt of another acid by treatment with a solution of an alkali salt of such other acid, e. g. potassium chloride, potassium bromide or potassium iodide.

The following examples illustrate the invention:

EXAMPLE I

*Preparation of ω-1-bis-methylthio-vinyl-benzthiazole ethiodide*

5 gms. of (N-ethyl-dihydrobenzthiazolylidene-1)-dithioacetic acid, 5 ccs. of methyl iodide and 0.7 cc. of methyl alcohol were mixed together and boiled with 200 ccs. of dry benzene for one hour.

The hot solution was then filtered and 5 ccs. of methyl iodide and 0.5 cc. of methyl alcohol were added to the filtrate. The filtrate was then boiled for one hour and the desired product separated as a brown crystalline solid. The solution was then cooled and filtered, and after purification by boiling out with methyl alcohol, the product was obtained as a pale yellow solid. Melting at 199° C.

EXAMPLE II

*Preparation of ω-1-bis-methylthio-vinyl - benzthiazole methiodide*

2.4 gms. of (N-methyl-dihydrobenzthiazolylidene-1-dithioacetic acid, 6 cc. of methyl iodide and 1 cc. of methyl alcohol were mixed together and heated in a sealed tube at 100° C. for seventeen hours. The mixture was cooled, and the separated solid material removed by filtration. The solid material was washed with methyl alcohol and yielded the product as a dark red solid, melting at 191° C. with decomposition.

EXAMPLE III

Preparation of the dyestuff of the probable formula:

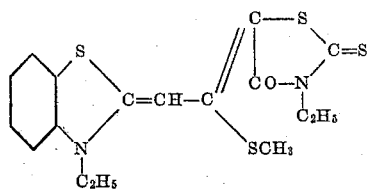

0.8 gm. of N-ethyl rhodanic acid, 1.02 gms. of ω-1-bis-methylthio-vinyl-benzthiazole ethiodide and 25 ccs. of absolute alcohol were mixed together and boiled. 0.6 cc. of triethylamine were added and the mixture boiled for a further twenty minutes. A few cubic centimeters of pyridine were then added whereupon the product precipitated out as green crystals. The solution was cooled and the product separated by filtration. On purification by boiling out with methyl alcohol the product was obtained as green crystals melting at 195° C.

EXAMPLE IV

Preparation of the dyestuff of the probable formula:

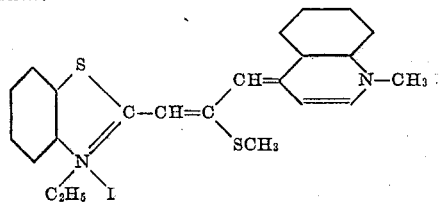

The process was carried out as in Example III using 0.7 gm. of lepidine methiodide, 0.95 gm. of ω-1-bis-methylthiovinyl-benzthiazole ethiodide, 25 ccs. of absolute alcohol and 0.5 cc. of triethylamine. The product was obtained as green crystals melting at 189° C.

EXAMPLE V

Preparation of the dyestuff of the probable formula:

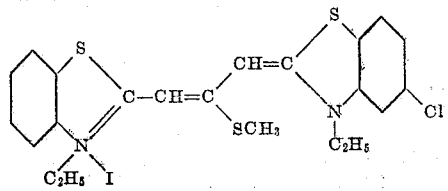

The process was carried out as in Example III using 1.2 gms. of 1-methyl-4-chlor-benzthiazole ethiodide, 0.7 gm. of ω-1-bis-methylthio-vinyl-benzthiazole ethiodide, 20 ccs. of absolute alcohol and 0.4 cc. of triethylamine. The product after recrystallisation from methyl alcohol solution was obtained as dark green crystals melting at 164° C. When incorporated in a gelatino silver iodo-bromide emulsion, this dyestuff extends the sensitivity of the emulsion to about 7000 Å. with a maximum at about 6750 Å.

EXAMPLE VI

Preparation of the dyestuff of the probable formula:

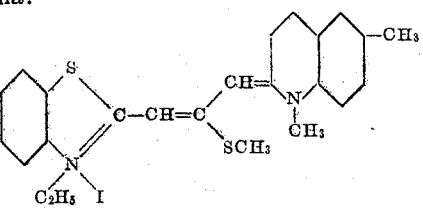

The process was carried out as in Example III using 0.45 gm. of p-toluquinaldine methiodide, 0.75 gm. of ω-1-bis-methylthio-vinyl-benzthiazole ethiodide, 20 ccs. of absolute alcohol and 0.3 cc. of triethylamine. The product after recrystallisation from methyl alcohol solution was obtained as blue crystals, melting at 210° C.

When incorporated in a gelatino silver iodobromide emulsion, this dyestuff extends the sensitivity of the emulsion to about 7000 Å. with a maximum at about 6800 Å.

EXAMPLE VII

Preparation of the dyestuff of the probable formula:

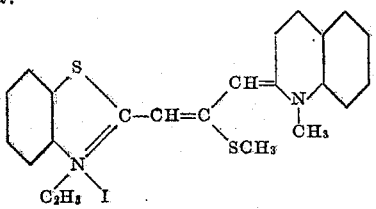

The process was carried out as in Example III using 1.4 gms. of quinaldine methiodide, 1 gm. of ω-1-bis-methylthio-vinyl-benzthiazole ethiodide, 25 ccs. of absolute alcohol and 0.6 cc. of triethylamine. The product was obtained as bronze-green crystals.

EXAMPLE VIII

The preparation of the dyestuff of the probable formula:

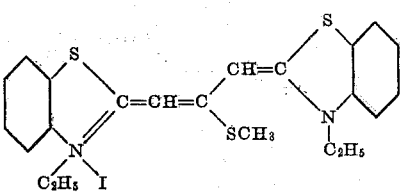

The process was carried out as in Example III using 0.6 gm. of 1-methyl-benzthiazole ethiodide, 0.41 gm. of ω-1-bis-methylthio-vinyl-benzthiazole ethiodide, 15 ccs. of ethyl alcohol and 0.22 cc. of triethylamine. The product after recrystallisation from methyl alcohol solution was obtained as a green dye melting at 204° C.

When incorporated in a gelatino silver iodo bromide emulsion this dyestuff extends the sensitivity of the emulsion to about 6600 A. with a maximum at about 6200 A.

Example IX

Preparation of the dyestuff of the probable formula:

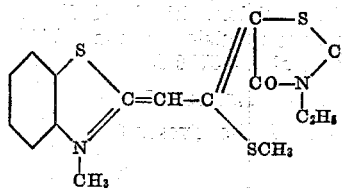

The process was carried out as in Example III using 0.8 gm. of N-ethyl rhodanic acid, 1 gm. of ω-1-b i s -methylthio-vinyl-benzthiazolemethiodide, 25 ccs. of absolute alcohol and 0.6 cc. of triethylamine. The product precipitated from solution immediately after the addition of the triethylamine and no pyridine was therefore added. After boiling and filtering the solution, the product was obtained as a purple solid melting at 239° C.

Example X

Preparation of the dyestuff of the probable formula:

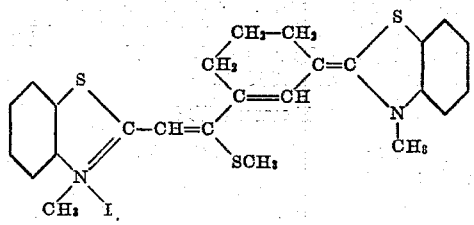

1.07 gms. of Δ'-cyclohexenyl-benzthiazole, 0.6 gm. of (N-methyl-dihydrobenzthiazolylidene-1)-dithio-acetic acid methyl ester and 1.86 gms. of methyl-p-toluene sulphonate were mixed together and fused for 2½ hours at 160° C. 15 ccs. of pyridine were then added and the mixture boiled for half an hour and then poured into an aqueous solution of potassium iodide. The product separated as green crystals having, after recrystallisation from methyl alcohol solution, a melting point of 212° C.

Example XI

Preparation of the dyestuff of the probable formula:

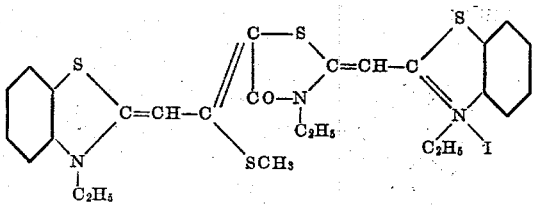

0.5 gm. of the dyestuff produced according to Example III, 0.3 gm. of 1-methyl-benzthiazole and 1.2 gms. of ethyl-p-toluene sulphonate were mixed together and fused for 1½ hours at 160° C. 15 ccs. of pyridine were added and the mixture refluxed for forty minutes and then poured into an aqueous solution of potassium iodide. On cooling, the product separated as dark green crystals having, after recrystallisation from methyl alcohol a melting point of 263° C.

Example XII

Preparation of the dyestuff of probable formula:

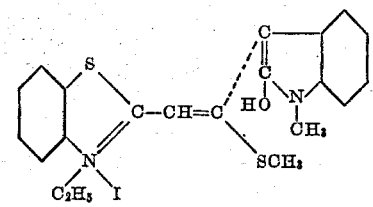

0.4 gm. of 2-ω-dimethyl-dimercapto vinyl benzthiazole ethiodide, 0.32 gm. of N-methyl oxindole and 15 ccs. of absolute alcohol were mixed together and boiled. 0.2 gm. of triethylamine was added and boiling continued for one hour. A little pyridine was then added to the pink solution which was cooled until the desired product separated as a light pink solid. After recrystallising from ligroin, the product was obtained in the form of green needles with blue reflex and melting at 90° C.

Example XIII

Preparation of the dyestuff of probable formula:

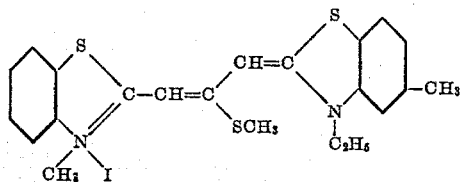

1.1 gms. of 1:4-dimethyl benzthiazole, 0.8 gm. of (N-methyl - dihydrobenzthiazolylidene-1) - dithio acetic acid methyl ester and 2.7 gms. of ethyl-p-toluene sulphonate were mixed together and fused at 140–150° C. for 3 hours. 20 ccs. of pyridine were then added and the mixture boiled for half an hour and then poured into an aqueous solution of potassium iodide. The product separated and was recrystallised from methyl alcohol. The dye was thus obtained as red flaky crystals melting at 224° C.

Example XIV

Preparation of the dyestuff of probable formula:

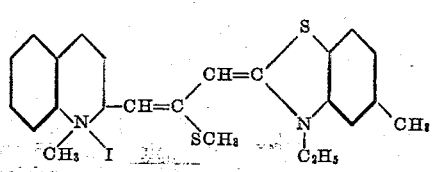

The process was carried out as in Example XIII using 1.1 gms. of 1:4-dimethyl benzthiazole, 0.8 gm. of (N-methyl-1:2-dihydro equinolylidene-2)-dithio acetic acid methyl ester and 2.7 gms. of ethyl-p-toluene sulphonate. The product which separated from the aqueous potassium iodide solution was triturated with benzene prior to recrystallising from methyl alcohol. The dye was thus obtained as green crystals melting at 173° C.

When incorporated in a gelatino silver iodobromide emulsion, this dyestuff extends the sensitivity of the emulsion to about 6900 A. with a maximum at about 6400 A.

Example XV

Preparation of the dyestuff of probable formula:

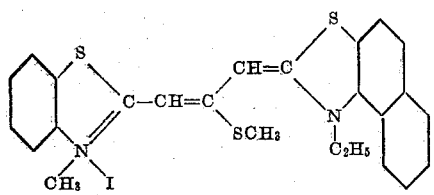

1.4 gms. of 2-methyl-β-naphthiazole, 0.8 gm. of (N-methyl - dihydrobenzthiazolylidene-1) - dithio acetic acid methyl ester and 2.7 gms. of ethyl-p-toluene sulphonate were mixed together and fused for 3 hours at 180–190° C. 20 ccs. of pyridine were then added and the mixture boiled for 40 minutes and then poured into an aqueous solution of potassium iodide. The product was recrystallised from methyl alcohol to give a greenish coloured dye of melting point 261° C. When incorporated in a gelatino silver iodo-bromide emulsion, this dyestuff extends the sensitivity of the emulsion to about 7200 Å. with a maximum of about 6800 Å.

Example XVI

Preparation of the dyestuff of probable formula:

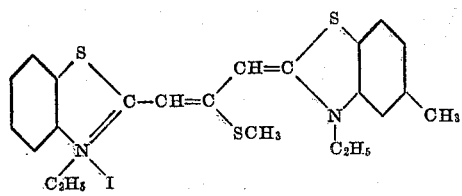

1.1 gms. of 1:4-dimethyl benzthiazole, 0.85 gm. of (N-ethyl-dihydrobenzthiazolylidene-1)-dithio acetic acid methyl ester and 2.7 gms. of ethyl-p-toluene sulphonate were mixed together and fused for 3 hours at 140° C. 20 ccs. of pyridine were then added and the mixture boiled for half an hour and then poured into an aqueous solution of potassium iodide. Benzene was added with stirring and the mixture allowed to stand for 16 hours. The product which separated was recrystallised from methyl alcohol to give a green dye melting at 182° C. When incorporated in a gelatino silver iodo-bromide emulsion, this dyestuff extends the sensitivity of the emulsion to about 6900 Å. with a maximum at about 6400 Å.

Example XVII

Preparation of the dyestuff of probable formula:

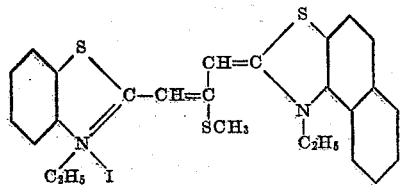

1.4 gms. of 2-methyl- -naphthathiazole, 0.85 gm. of (N-ethyl-dihydrobenzthiazolylidene-1)-dithio acetic acid methyl ester and 2.7 gms. of ethyl-p-toluene sulphonate were mixed together and fused at 150° C. for 3 hours. 20 ccs. of pyridine were then added and the mixture boiled for 40 minutes and then poured into an aqueous solution of potassium iodide. The product which separated was washed with boiling benzene and then extracted with hot methyl alcohol. On cooling the methyl alcoholic liquor, the dye separated as green crystals melting at 134° C. When incorporated in a gelatino silver iodo bromide emulsion, this dyestuff extends the sensitivity of the emulsion to about 7000 Å. with a maximum at about 6600 Å.

Example XVIII

Preparation of the dyestuff of probable formula:

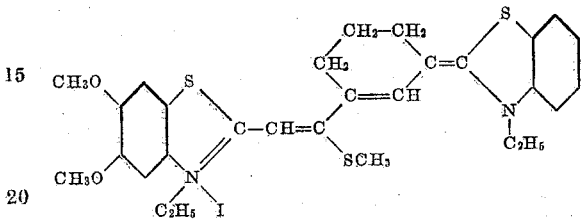

The process was carried out as in Example XIII using 0.54 gm. cyclohexenyl benzthiazole, 0.8 gm. of (2-ethyl-4:5-dimethoxydihydrobenzthiazolylidene-1)-dithio acetic acid methyl ester and 2.7 gms. of ethyl-p-toluene sulphonate.

Example XIX

Preparation of the dyestuff of probable formula:

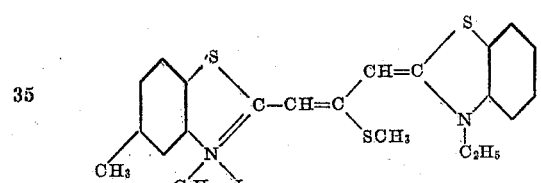

0.75 gm. of 1-methyl-benzthiazole, 0.7 gm. of (2-ethyl-4-methyl-dihydro-benzthiazolylidene - 1) - dithio-acetic acid methyl ester and 2.0 gms. of ethyl-p-toluene sulphonate were mixed together and fused for 3 hours at 140° C. 20 ccs. of pyridine were then added and the mixture boiled for half an hour and then poured into an aqueous solution of potassium iodide which was afterwards diluted with water. The product which separated was washed with spirit and benzene and then recrystallised from methyl alcoholic solution to give a green dye melting at 172° C.

Example XX

Preparation of the dyestuff of probable formula:

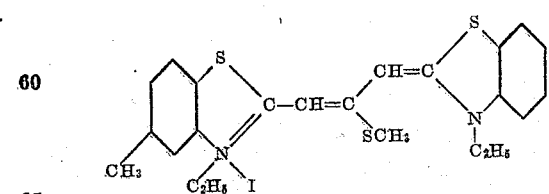

The process was carried out as in Example XIII using 0.92 gm. of 1 methyl-4-chloro-benzthiazole, 0.7 gm. of (2-ethyl-4-methyl-dihydrobenzthiazolylidene-1)-dithio acetic acid methyl ester and 2.0 gms. of ethyl-p-toluene sulphonate. The product was obtained as a green dye melting at 182° C. When incorporated in a gelatino silver iodo-bromide emulsion, this dyestuff extends the sensitivity of the emulsion to about 7200 Å. with a maximum at about 6700 Å.

Example XXI

Preparation of the dyestuff of probable formula:

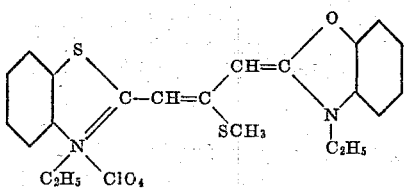

0.6 gm. of 1-methyl-benzoxazole, 0.6 gm. of (N-ethyldihydrobenzthiazolylidene-1)-dithio acetic acid methyl ester and 2.0 gms. of ethyl-p-toluene sulphonate were mixed together and fused for 3 hours at 140° C. 15 ccs. of pyridine were then added and the mixture boiled for half an hour and then poured into an aqueous solution of potassium perchlorate. The product separated, and was recrystallised from methyl alcohol to give a brownish coloured dye melting at 230° C. When incorporated in a gelatino silver iodo bromide emulsion this dyestuff extends the sensitivity of the emulsion to about 6300 A. with a maximum at about 5500 A.

Example XXII

Preparation of the dyestuff of probable formula:

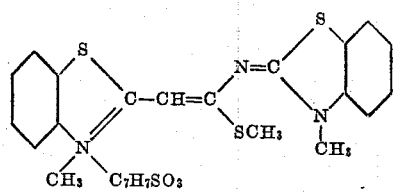

1.2 gms. of (N-methyl-dihydrobenzthiazolylidene-1)-dithio-acetic acid methyl ester, 1.48 gms. of 1-amino benzthiazole and 3.76 gms. of methyl-p-toluene sulphonate were mixed together and fused for 3 hours at 140° C. The mixture was then cooled, 20 ccs. of pyridine were added and the mixture refluxed for 30 minutes. The mixture was then cooled and diluted with water whereupon the product separated. On recrystallisation from methyl alcohol solution the product was obtained as bright yellow flakes melting at 172° C.

Example XXIII

Preparation of the dyestuff of probable formula:

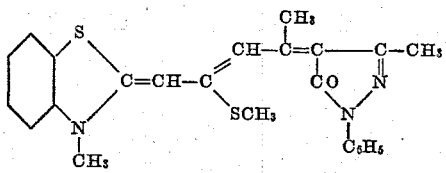

0.94 gms. of 2-ω-dimethyl-dimercapto-vinyl-benzthiazole methiodide, 1.07 gms. of 1-phenyl-3-methyl-4-isopropylidene-5-pyrazolone and 20 ccs. of ethyl alcohol were boiled together and 1 cc. of triethylamine was added. The mixture was then boiled for half an hour and then cooled, whereupon a black tar separated. This tar was dissolved in hot ethyl alcohol and then cooled whereupon the product separated as black crystals. After boiling out with methyl alcohol the dye was obtained as a shining black solid melting at 219° C.

As stated above, and as indicated in the foregoing examples, the dyestuffs of this invention are valuable sensitisers for silver halide photographic emulsions. They may be incorporated in silver halide emulsions of all types, e. g. silver chloride, silver bromide, silver chlorobromide and silver iodobromide emulsions. The quantity of sensitising dye employed will, of course, vary with the particular dye and with the purpose for which the emulsion is intended. In general, for a typical emulsion containing the equivalent of 2% silver calculated as metal, the proportion may range between 250 and 1250 ccs. of a 1 in 2,000 solution per litre of emulsion.

What I claim is:

1. Process for the production of dyestuffs which comprises condensing a compound of the general formula:

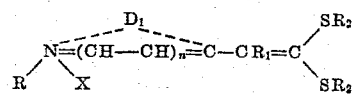

where R and $R_2$ are selected from the class consisting of alkyl and aralkyl groups, $R_1$ is selected from the group consisting of the hydrogen atom and alkyl, aryl and aralkyl groups, $D_1$ is the residue of a heterocyclic nitrogen compound of the type used in cyanine dyes, X is an acid residue and $n$ is selected from the group consisting of nought and 1, with a heterocyclic nitrogen compound containing a reactive methylene group of the type used in cyanine dyes.

2. Process for the production of dyestuffs which comprises condensing a compound of the general formula:

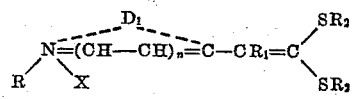

where R and $R_2$ are selected from the class consisting of alkyl and aralkyl groups, $R_1$ is selected from the group consisting of the hydrogen atom and alkyl, aryl and aralkyl groups, $D_1$ is the residue of a heterocyclic nitrogen compound of the type used in cyanine dyes, X is an acid residue, and $n$ is selected from the group consisting of nought and 1, with a five membered ring compound of the general formula:

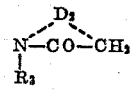

where $D_2$ is the residue of a heterocyclic nitrogen keto-methylene compound and $R_3$ is selected from the group consisting of the hydrogen atom and hydrocarbon groups.

3. Process for the production of dyestuffs which comprises condensing a compound of the general formula:

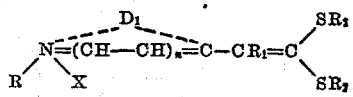

where R and $R_2$ are selected from the class consisting of alkyl and aralkyl groups, $R_1$ is selected from the group consisting of the hydrogen atom and alkyl, aryl and aralkyl groups, $D_1$ is the residue of heterocyclic nitrogen compound of the type used in cyanine dyes, X is an acid residue, and $n$ is selected from the group consisting of nought and 1, with a quaternary salt of a heterocyclic nitrogen compound of the type used in cyanine dyes containing in one of the α and γ positions to the quaternary nitrogen atom a hydrocarbon substituent grouping which includes a reactive methylene group.

4. Process according to claim 3 wherein the hydrocarbon substituent grouping which includes a reactive methylene groups is of the formula:

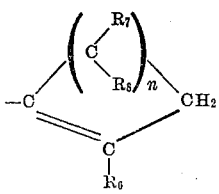

where the groups $R_6$, $R_7$ and $R_8$ are selected from the group consisting of hydrogen atoms and hydrocarbon groups and $n$ is a positive integer greater than 1.

5. Process for the production of dyestuffs which comprises condensing a compound of the general formula:

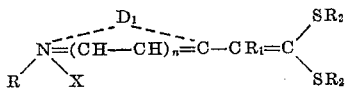

where R and $R_2$ are selected from the class consisting of alkyl and aralkyl groups, $R_1$ is selected from the group consisting of the hydrogen atom and alkyl, aryl and aralkyl groups, $D_1$ is the residue of a heterocyclic nitrogen compound of the type used in cyanine dyes, X is an acid residue, and $n$ is selected from the group consisting of nought and 1, with a five-membered ring compound of the general formula:

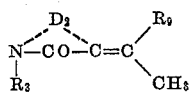

where $D_2$ is the residue of a heterocyclic nitrogen keto-methylene compound and $R_3$ and $R_9$ are selected from the group consisting of hydrogen atoms and hydrocarbon groups.

6. Process for the production of dyestuffs which comprises condensing a compound of the general formula:

$$N\!=\!(CH\!=\!CH)_n\!-\!C\!=\!CR_1\!-\!C\diagdown_S^{SR_2}$$

where R and $R_2$ are selected from the class consisting of alkyl and aralkyl groups, $R_1$ is selected from the group consisting of the hydrogen atom and alkyl, aryl and aralkyl groups, $D_1$ is the residue of a heterocyclic nitrogen compound of the type used in cyanine dyes and $n$ is selected from the group consisting of nought and 1, with a heterocyclic nitrogen compound of the type used in cyanine dyes containing in one of the $\alpha$ and $\gamma$ positions to the heterocyclic nitrogen atom a reactive methylene group, in the presence of sufficient of a salt of the formula $R_2X$, where X is an acid radical and $R_2$ is a radical taken from the group consisting of alkyl and aralkyl radicals, to convert both of said reactants to quaternary nitrogen salts.

7. Process according to claim 6 wherein the salt employed is selected from the group consisting of alkyl and aralkyl-p-toluene sulphonates.

8. A dyestuff of the formula:

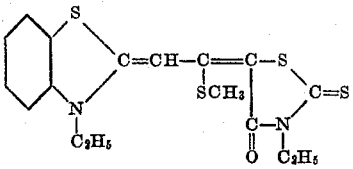

9. A dyestuff of the formula:

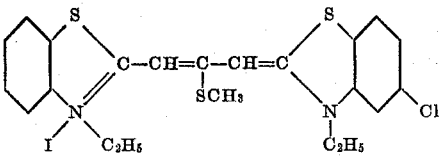

JOHN DAVID KENDALL.